(12) United States Patent
Ozcan et al.

(10) Patent No.: US 9,715,099 B2
(45) Date of Patent: Jul. 25, 2017

(54) MASKLESS IMAGING OF DENSE SAMPLES USING MULTI-HEIGHT LENSFREE MICROSCOPE

(75) Inventors: Aydogan Ozcan, Los Angeles, CA (US); Alon Greenbaum, West Hollywood, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 419 days.

(21) Appl. No.: 14/356,131

(22) PCT Filed: Jul. 20, 2012

(86) PCT No.: PCT/US2012/047725
§ 371 (c)(1),
(2), (4) Date: May 2, 2014

(87) PCT Pub. No.: WO2013/070287
PCT Pub. Date: May 16, 2013

(65) Prior Publication Data
US 2014/0300696 A1    Oct. 9, 2014

Related U.S. Application Data

(60) Provisional application No. 61/556,697, filed on Nov. 7, 2011.

(51) Int. Cl.
*H04N 5/89* (2006.01)
*G02B 21/36* (2006.01)
(Continued)

(52) U.S. Cl.
CPC ......... *G02B 21/365* (2013.01); *G02B 21/367* (2013.01); *G03H 1/0005* (2013.01);
(Continued)

(58) Field of Classification Search
CPC .. G02B 21/365; G02B 21/367; G03H 1/0005; G03H 1/0443; G03H 1/0866; G06T 3/0068
See application file for complete search history.

(56) References Cited

U.S. PATENT DOCUMENTS 6,876,474 B2   4/2005  Kreuzer et al.
7,729,049 B2   6/2010  Xu et al.
(Continued)

OTHER PUBLICATIONS

Isikman, S. et al., Lensfree Cell Holography on a Chip: From Holographic Cell Signatures to Microscopic Reconstruction, Proceedings of IEEE Photonics Society Annual Fall Meeting, pp. 404-405 (2009).

(Continued)

*Primary Examiner* — Tat Chio
(74) *Attorney, Agent, or Firm* — Vista IP Law Group LLP

(57) ABSTRACT

A method of imaging includes illuminating a sample spaced apart from an image sensor at a multiple distances. Image frames of the sample obtained at each distance are registered to one another and lost phase information from the registered higher resolution image frames is iteratively recovered. Amplitude and/or phase images of the sample are reconstructed based at least in part on the recovered lost phase information.

10 Claims, 13 Drawing Sheets

(51) Int. Cl.
  *G03H 1/08* (2006.01)
  *G03H 1/00* (2006.01)
  *G06T 3/00* (2006.01)
  *G03H 1/04* (2006.01)
  *G03H 1/26* (2006.01)

(52) U.S. Cl.
  CPC ......... *G03H 1/0443* (2013.01); *G03H 1/0866* (2013.01); *G06T 3/0068* (2013.01); *G03H 2001/005* (2013.01); *G03H 2001/0447* (2013.01); *G03H 2001/0454* (2013.01); *G03H 2001/2655* (2013.01); *G03H 2210/12* (2013.01); *G03H 2210/55* (2013.01); *G03H 2240/56* (2013.01)

(56) References Cited

U.S. PATENT DOCUMENTS

| | | | |
|---|---|---|---|
| 8,842,901 B2 | 9/2014 | Ozcan et al. | |
| 8,866,063 B2 | 10/2014 | Ozcan et al. | |
| 8,916,390 B2 | 12/2014 | Ozcan et al. | |
| 9,007,433 B2 | 4/2015 | Ozcan et al. | |
| 9,057,702 B2 | 6/2015 | Ozcan et al. | |
| 9,202,835 B2 | 12/2015 | Ozcan et al. | |
| 9,331,113 B2 | 5/2016 | Ozcan et al. | |
| 2007/0230814 A1* | 10/2007 | Haseyama | G06T 7/0083 382/254 |
| 2011/0109735 A1* | 5/2011 | Otsuka | G01J 3/02 348/79 |
| 2012/0098950 A1 | 4/2012 | Zheng et al. | |
| 2012/0148141 A1 | 6/2012 | Ozcan et al. | |
| 2012/0157160 A1 | 6/2012 | Ozcan et al. | |
| 2012/0218379 A1 | 8/2012 | Ozcan et al. | |
| 2012/0248292 A1 | 10/2012 | Ozcan et al. | |
| 2013/0092821 A1 | 4/2013 | Ozcan et al. | |
| 2013/0157351 A1 | 6/2013 | Ozcan et al. | |
| 2013/0193544 A1 | 8/2013 | Ozcan et al. | |
| 2013/0203043 A1 | 8/2013 | Ozcan et al. | |
| 2013/0258091 A1 | 10/2013 | Ozcan et al. | |
| 2013/0280752 A1 | 10/2013 | Ozcan et al. | |
| 2014/0120563 A1 | 5/2014 | Ozcan et al. | |
| 2014/0160236 A1 | 6/2014 | Ozcan et al. | |
| 2015/0111201 A1 | 4/2015 | Ozcan et al. | |
| 2015/0153558 A1 | 6/2015 | Ozcan et al. | |
| 2015/0204773 A1 | 7/2015 | Ozcan et al. | |
| 2016/0070092 A1 | 3/2016 | Ozcan et al. | |

OTHER PUBLICATIONS

Allen, L.J. et al., Phase retrieval from series of images obtained by defocus variation, Optics Communications, 2001, 199, 65-75.
PCT International Preliminary Report on Patentability (Chapter I of the Patent Cooperation Treaty) for PCT/US2012/047725, Applicant: The Regents of the University of California, Form PCT/IB/326 and 373, dated May 22, 2014 (7pages).
Isikman et al., "Lensfree Cell Holography on a Chip: From Holographic Cell Signatures to Microscopic Reconstruction," Proceedings of IEEE Photonics Society Annual Fall Meeting, pp. 404-405 (2009).
L. J. Allen and M. P. Oxley, Optics Communications, 2001, 199, 65-75.
Bishara, W. et al., Lensfree on-chip microscopy over a wide field-of-view using pixel super-resolution, Published in final edited form as: Opt Express, May 24, 2010; 18(11):11181-11191.
Bishara, W. et al., Lensfree on-chip microscopy over a wide field-of-view using pixel super-resolution; May 24, 2010, vol. 18, No. 11, Optic Express, 11181-11191.
Su, Ting-Wei et al., Multi-angle lensless digital holography for depth resolved imaging on a chip, Opt. Express, Apr. 26, 2010; 18(9): 9690-9711.
PCT International Search Report for PCT/US2012/047725, Applicant: The Regents of the University of California, Form PCT/ISA/210 and 220, dated Dec. 17, 2012 (5pages).
PCT Written Opinion of the International Search Authority for PCT/US2012/047725, Applicant: The Regents of the University of California, Form PCT/ISA/237, dated Dec. 17, 2012 (5pages).
Pech-Pacheco, J.L. et al., "Diatom Autofocusing in Brightfield Microscopy: a Comparative Study," in Pattern Recognition, International Conference on (IEEE Computer Society, 2000), vol. 3, p. 3318.
Oh, C. et al., "On-chip differential interference contrast microscopy using lens-less digital holography." Opt Express.;18(5):4717-4726 (2010).
Bishara et al., "Holographic pixel super-resolution in portable lensless on-chip microscopy using a fiber-optic array," Lab Chip 11, 1276 (2011).
Coskun et al., Lensless wide-field fluorescent imaging on a chip using compressive decoding of sparse objects, Optics Express, vol. 18 No. 10, May 5, 2010.
Coskun et al., Wide field-of-view lens-free fluorescent imaging on a chip, Lab Chip, 10(7), 824-827, Apr. 7, 2010.
Hardie et al., Joint Map Registration and High-Resolution Image Estimation Using a Sequence of Undersampled Images, IEEE, vol. 6 No. 12, Dec. 1997.
Isikman et al., Lensfree Cell Holography on a Chip: From Holographic Cell Signatures to Microscopic Reconstruction, LEOS Annual Meeting Conf. Proceedings, Oct. 2009.
Mudanyali et al., Compact, light-weight and cost-effective microscope based on lensless incoherent holography for telemedicine applications, Lab Chip, 10, 1417-1428, Apr. 19, 2010.
Ozcan et al., Ultra wide-filed lens-free monitoring of cells on-chip, Lab on Chip 8, 89-106, Nov. 1, 2007.
Ozcan et al., Lens-free On-Chip Cytometry for wireless Health Diagnosis, IEEE LEOS Newsletter, Oct. 2008.
Ozcan et al., Lensfree on-chip holography facilitates novel microscopy applications, SPIE, May 19, 2010.
Ozcan, Smart technology for global access to healthcare, SPIE, Mar. 16, 2010.
Seo et al., Lensfree holographic imaging for on-chip cytometry and diagnostics, Lab on a Chip, 9, 777-787, Dec. 5, 2008.
Su et al., Towards Wireless Health: Lensless On-Chip Cytometry, Biophotonics, Dec. 2008.
Su et al., High-Throughput Lensfree Imaging and Characterization of Heterogeneous Cell Solution on a Chip, Biotechnology and Bioengineering, Sep. 8, 2008.
Seo et al., Lensfree On-chip Cytometry Using Tunable Monochromatic Illumination and Digital Noise Reduction, Multi-color LUCAS, Sep. 2008.
Khademhosseinieh et al., Lensfree on-chip imaging using nanostructured surfaces, Applied Physics Letters, 96, 171106, Apr. 30, 2010.
Khademhosseinieh et al., Lensfree color imaging on a nanostructured chip using compressive decoding, Applied Physics Letters, 97, 211112-1, Nov. 24, 2010.
Mudanyali et al., Lensless On-chip Imaging of Cells Provides a New Tool for High-throughput Cell-Biology and Medical Diagostics, Journal of Visualized Experiments, Dec. 14, 2009.
Lee et al., Field-portable reflection and transmission microscopy based on lensless holography, Biomedical Optics Express, vol. 2, No. 9, Aug. 30, 2011.
Zheng, Guoan et al., Sub-pixel resolving optofluidic microscope for on-chip cell imaging, Lab Chip, 2010, 10, 3125-3129.

* cited by examiner

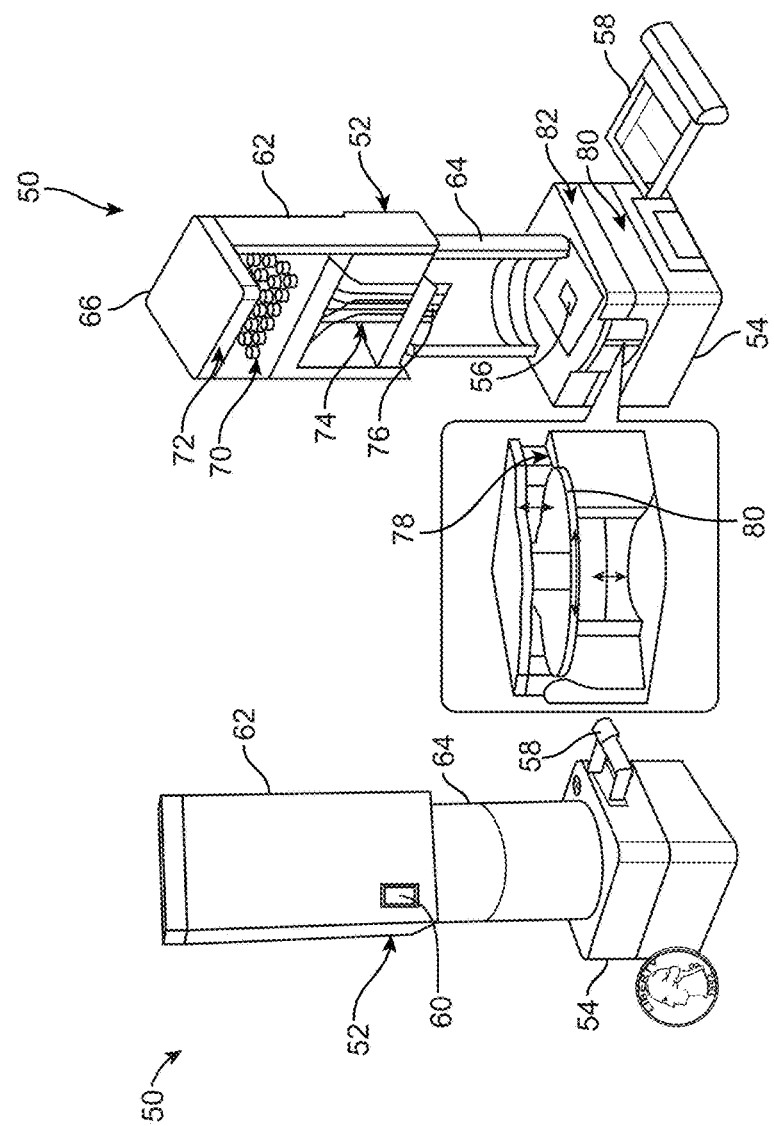

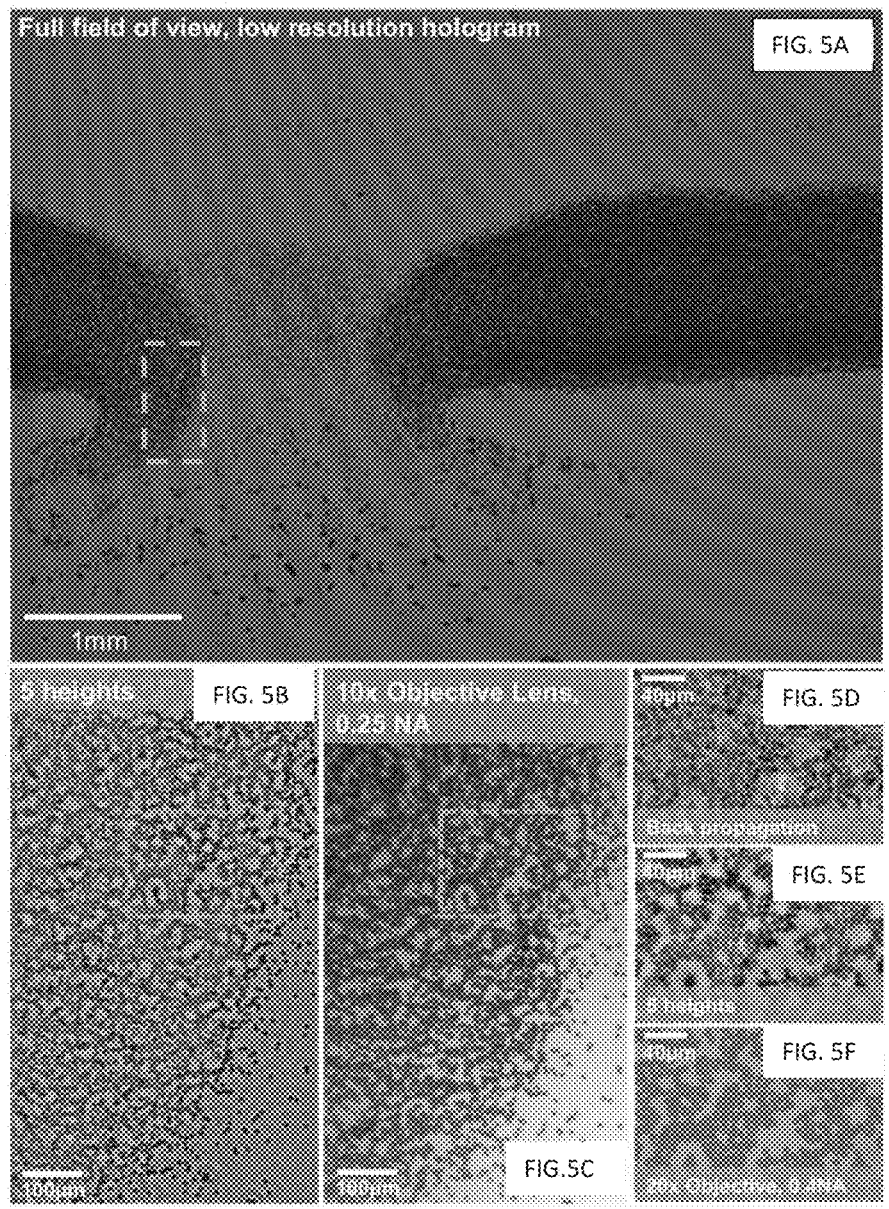

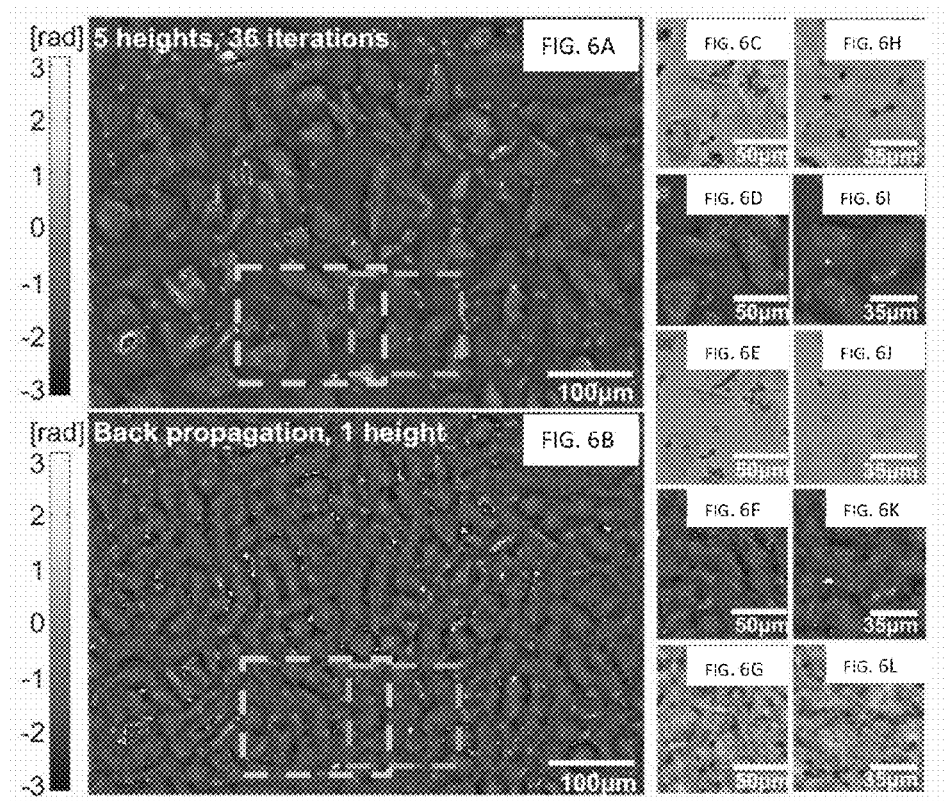

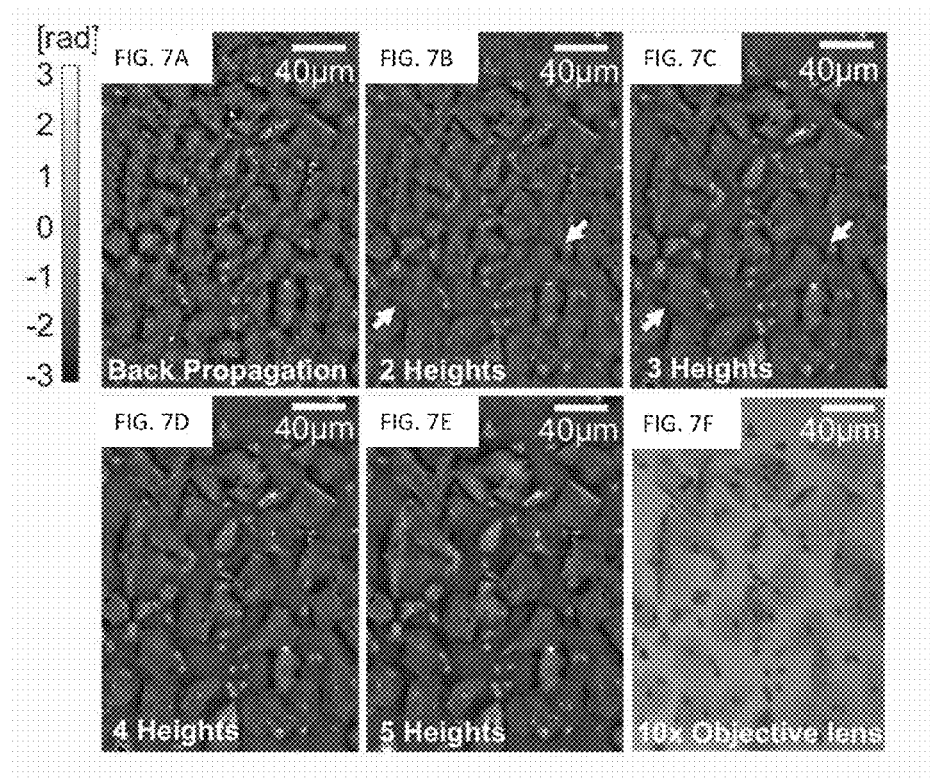

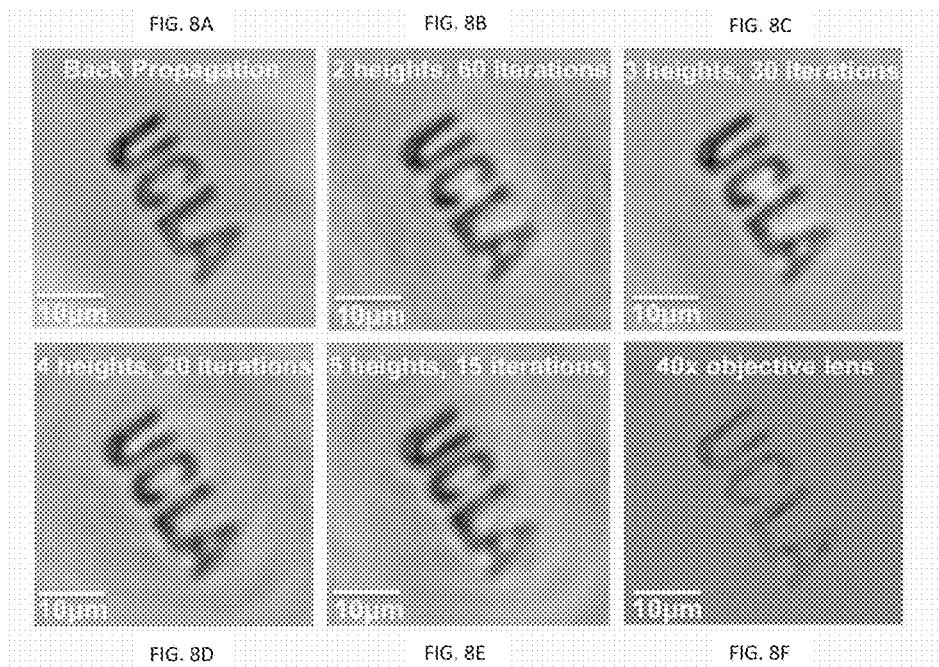

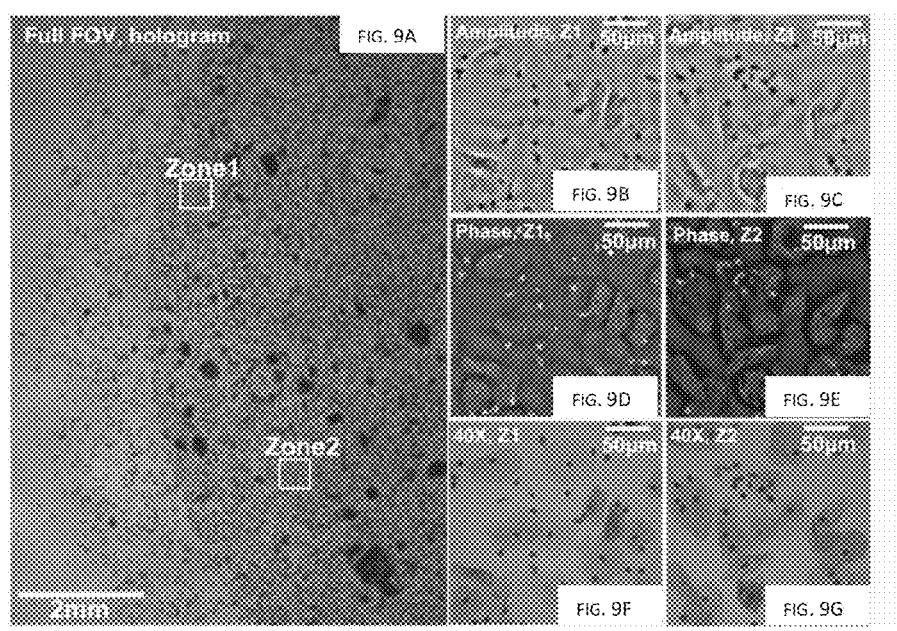

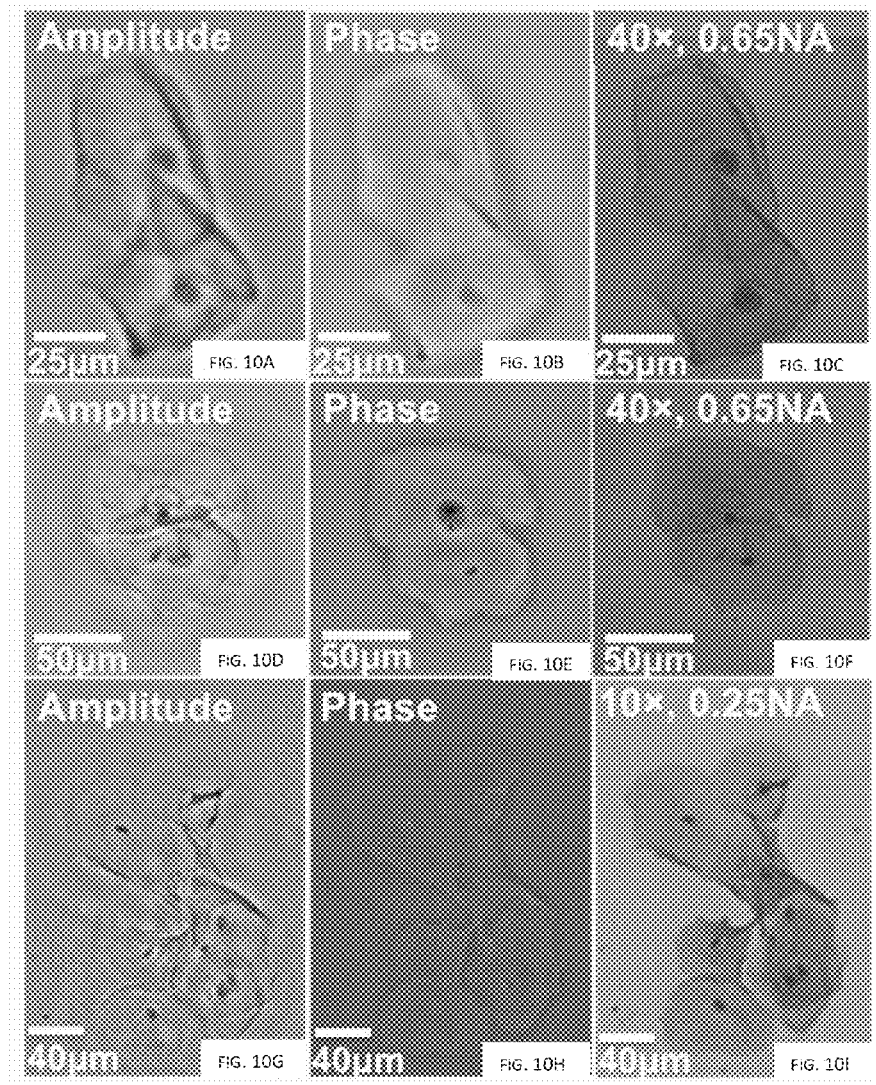

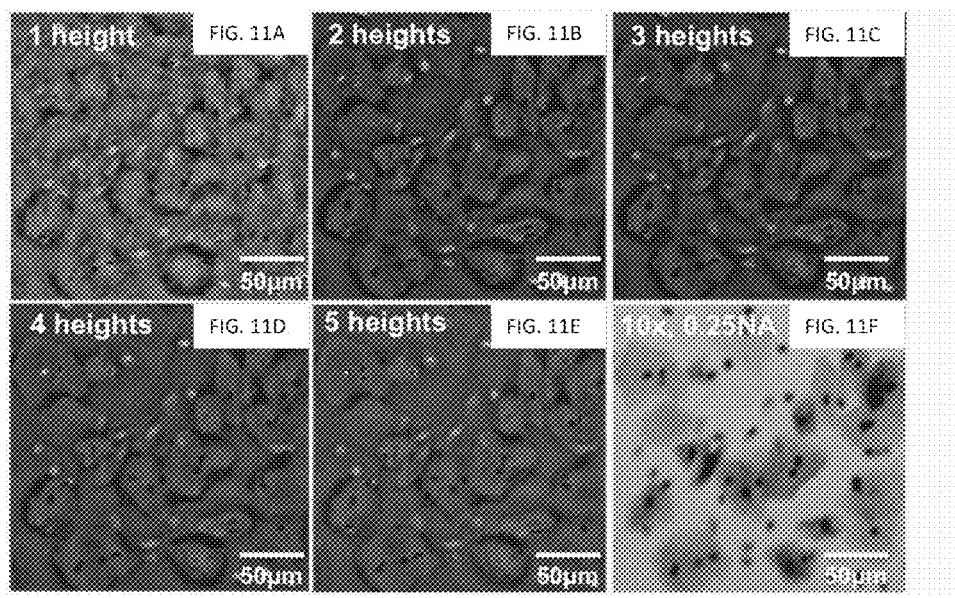

MASKLESS IMAGING OF DENSE SAMPLES USING MULTI-HEIGHT LENSFREE MICROSCOPE

RELATED APPLICATION

This Application is a U.S. National Stage filing under 35 U.S.C. §371 of PCT Patent Application No. PCT/US2012/047725, filed Jul. 20, 2012, which claims priority to U.S. Provisional Patent Application No. 61/556,697, filed on Nov. 7, 2011. The contents of the aforementioned applications are incorporated by reference herein. Priority is expressly claimed in accordance with 35 U.S.C. §§119, 120, 365 and 371 and any other applicable statutes.

STATEMENT REGARDING FEDERALLY SPONSORED RESEARCH OR DEVELOPMENT

This invention was made with Government support under Grant Number OD006427, awarded by the National Institutes of Health and Grant Numbers 0754880 and 0930501, awarded by the National Science Foundation and Grant Number N00014-09-1-0858, awarded by the U.S. Navy, Office of Naval Research. The Government has certain rights in the invention.

FIELD OF THE INVENTION

The field of the invention generally relates to imaging systems and methods and more particularly imaging systems that have particular application in the imaging and analysis of small particles such as cells, organelles, cellular particles and the like.

BACKGROUND

Digital holography has been experiencing a rapid growth over the last several years, together with the availability of cheaper and better digital components as well as more robust and faster reconstruction algorithms, to provide new microscopy modalities that improve various aspects of conventional optical microscopes. In an effort to achieve wide-field on-chip microscopy, the use of unit fringe magnification (F~1) in lensfree in-line digital holography to claim an FOV of ~24 mm$^2$ with a spatial resolution of <2 μm and an NA of ~0.1-0.2 has been demonstrated. See Oh C. et al. On-chip differential interference contrast microscopy using lens-less digital holography. Opt Express.; 18(5):4717-4726 (2010) and Isikman et al., Lensfree Cell Holography On a Chip: From Holographic Cell Signatures to Microscopic Reconstruction, Proceedings of IEEE Photonics Society Annual Fall Meeting, pp. 404-405 (2009), both of which are incorporated herein by reference. This recent work used a spatially incoherent light source that is filtered by an unusually large aperture (~50-100 μm diameter); and unlike most other lens-less in-line holography approaches, the sample plane was placed much closer to the detector chip rather than the aperture plane, i.e., $z_1 \gg z_2$. This unique hologram recording geometry enables the entire active area of the sensor to act as the imaging FOV of the holographic microscope since F~1. More importantly, there is no longer a direct Fourier transform relationship between the sample and the detector planes since the spatial coherence diameter at the object plane is much smaller than the imaging FOV. At the same time, the large aperture of the illumination source is now geometrically de-magnified by a factor that is proportional to $M=z_1/z_2$ which is typically 100-200. Together with a large FOV, these unique features also bring simplification to the set-up since a large aperture (~50 μm) is much easier to couple light to and align.

However, a significant trade-off is made in this recent approach. To wit, the pixel size now starts to be a limiting factor for spatial resolution since the recorded holographic fringes are no longer magnified. Because the object plane is now much closer to the detector plane (e.g., $z_2$~1 mm), the detection NA approaches ~1. However, the finite pixel size at the sensor chip can unfortunately record holographic oscillations corresponding to only an effective NA of ~0.1-0.2, which limits the spatial resolution to <2 μm. While, in principle, a higher spatial density of pixels could be achieved by reducing pixel size at the sensor to e.g., <1 μm, this has obvious technological challenges to use in a large FOV.

More recently, a lensfree super-resolution holographic microscope has been proposed which achieves sub-micron spatial resolution over a large field-of-view of e.g., ~24 mm$^2$. See Bishara et al., "Holographic pixel super-resolution in portable lensless on-chip microscopy using a fiber-optic array," Lab Chip 11, 1276 (2011), which is incorporated herein by reference. The microscope works based on partially-coherent lensfree digital in-line holography using multiple light sources (e.g., light-emitting diodes—LEDs) placed at ~3-6 cm away from the sample plane such that at a given time only a single source illuminates the objects, projecting in-line holograms of the specimens onto a CMOS sensor-chip. Since the objects are placed very close to the sensor chip (e.g., ~1-2 mm) the entire active area of the sensor becomes the imaging field-of-view, and the fringe-magnification is unit. As a result of this, these holographic diffraction signatures are unfortunately under-sampled due to the limited pixel size at the CMOS chip (e.g., ~2-3 μm). To mitigate this pixel size limitation on spatial resolution, several lensfree holograms of the same static scene are recorded as different LEDs are turned on and off, which creates sub-pixel shifted holograms of the specimens. By using pixel super-resolution techniques, these sub-pixel shifted under-sampled holograms can be digitally put together to synthesize an effective pixel size of e.g., ~300-400 nm, which can now resolve/sample much larger portion of the higher spatial frequency oscillations within the lensfree object hologram.

This super-resolved (SR) in-line hologram, however, still suffers from twin-image artifact, which is common to all in-line hologram recording geometries. In earlier work, the use of an iterative object-support based phase recovery method has been demonstrated to eliminate this twin-image artifact creating wide-field microscopic images of samples. This twin-image elimination method, however, requires as input the location estimations of the objects within the imaging field-of-view. To this end, a threshold or a segmentation algorithm can be used to automatically estimate the objects' locations (creating the object support) for relatively sparse samples. However, in denser specimens, this object support is difficult to estimate which can create challenges in removal of the twin-image artifact. For such dense specimens, a new approach is needed for pixel super-resolution holographic microscopy.

SUMMARY

In one aspect of the invention, to overcome these object-support related imaging challenges for dense and connected specimens, a new approach for pixel super-resolution holographic microscopy uses multiple (e.g., 2-5) lensfree intensity measurements that are each captured at a different heights (i.e., $z_2$ as seen in FIG. 1A) from the detector-array. Generally, each lensfree super-resolved hologram is synthesized with ~10-100 μm change in the relative height of the object with respect to the detector-chip surface (although other distances are contemplated), after which the super-resolved holograms are digitally registered and aligned to each other to take into account possible rotations and shifts. The co-registered super-resolved holograms, corresponding to different object heights, are then iteratively processed to recover the missing optical phase so that microscopic images of the specimens can be automatically reconstructed without the need for any spatial masking steps.

Therefore, this multi-height holographic approach eliminates the need to estimate the object-support at the sample plane cleaning the twin-image artifacts even for dense and connected specimens.

In one embodiment, a method of imaging a sample includes illuminating a sample spaced apart from an image sensor at a first distance with an illumination source; obtaining an image of the sample from an image sensor with the sample spaced apart from the image sensor at the first distance; illuminating the sample spaced apart from an image sensor at a one or more distances different from the first distance with an illumination source; obtaining an image of the sample from an image sensor with the sample spaced apart from the image sensor at the one or more distances different from the first distance; registering the images of the sample obtained at the one or more distances and the image of the sample obtained at the first distance; iteratively recovering lost phase information from the registered images; and reconstructing an amplitude or phase image of the sample based at least in part on the recovered lost phase information.

In another embodiment, a method of imaging a sample includes illuminating a sample spaced apart from an image sensor at a first distance with an illumination source at a plurality of different locations. Lower resolution image frames of the sample are obtained from an image sensor at plurality of different locations with the sample spaced apart from the image sensor at the first distance. A higher resolution image of the sample at the first distance is recovered based at least in part on the plurality of lower resolution image frames obtained at the first distance. The sample is illuminated at a one or more sample-to-sensor distances different from the first distance with an illumination source at a plurality of different locations. Lower resolution image frames are obtained of the sample from an image sensor at plurality of different locations with the sample spaced apart from the image sensor at the one or more distances different from the first distance. A higher resolution image of the sample is recovered at the one or more distances based at least in part on the plurality of lower resolution image frames obtained at the one or more distances. The higher resolution images of the sample obtained at the one or more distances and the higher resolution image of the sample obtained at the first distance are registered with one another. Lost phase information from the registered higher resolution images is iteratively recovered. Amplitude or phase images of the sample are reconstructed based at least in part on the recovered lost phase information.

In another embodiment, a system for imaging objects within a sample includes an image sensor; an illumination source configured to scan along a surface relative to the image sensor and illuminate the sample at a plurality of different locations; a sample interposed between the image sensor and the illumination source; means for adjusting an actual or effective distance between the sample and the image sensor; and at least one processor configured to reconstruct an image of the sample based on the images obtained from illumination source at the plurality of different scan positions.

In another embodiment, a system for imaging a sample includes an image sensor; one or more illumination sources coupled to an array of optical waveguides, wherein the each optical waveguide of the array terminates at a different spatial location in three dimensional space; a sample holder interposed between the image sensor and the one or more illumination sources; and means for adjusting an actual or effective distance between the sample holder and the image sensor.

BRIEF DESCRIPTION OF THE DRAWINGS

FIGS. 3A and 3B illustrate a portable microscope for imaging densely distributed objects contained in a sample according to another embodiment.

FIG. 5A shows a full FOV (~24 mm$^2$) low resolution (LR) lensfree hologram of a blood smear as captured by the image sensor. The dashed rectangle focuses on an area that is rather dense.

FIG. 5B illustrates a multi-height (5 different heights) PSR lensfree amplitude image of the rectangular region of FIG. 5A.

FIG. 5C illustrates a 10× microscope objective comparison image.

FIG. 5D illustrates a single height back propagated PSR amplitude image taken from the dashed rectangle in FIG. 5B.

FIG. 5E illustrates multi-height (5 different heights) PSR lensfree amplitude image of the rectangular region of FIG. 5B.

FIG. 5F illustrates a 20× objective lens (0.4 NA) microscope image of rectangular region of FIG. 5B (and FIG. 5C).

FIG. 6A illustrates a multi-height based PSR lensfree phase image of a Pap smear. This image was reconstructed using five heights. Fifty (50) iterations were used during phase recovery (λ=550 μm).

FIG. 6B illustrates a single height back propagated PSR phase image.

FIG. 6C illustrates multi-height based PSR lensfree amplitude image of the leftmost rectangle of FIG. 6A.

FIG. 6D illustrates multi-height based PSR lensfree phase image of the leftmost rectangle of FIG. 6A.

FIG. 6E illustrates a comparative 40× objective lens (0.65 NA) microscope image of the leftmost rectangle of FIG. 6A.

FIG. 6F illustrates the single height back propagated PSR phase image of the leftmost rectangle of FIG. 6B.

FIG. 6G illustrates the single height back propagated PSR amplitude image of the leftmost rectangle of FIG. 6B.

FIG. 6H illustrates multi-height based PSR lensfree amplitude image of the rightmost rectangle of FIG. 6A.

FIG. 6I illustrates multi-height based PSR lensfree phase image of the rightmost rectangle of FIG. 6A.

FIG. 6J illustrates a comparative 40× objective lens (0.65 NA) microscope image of the rightmost rectangle of FIG. 6A.

FIG. 6K illustrates the single height back propagated PSR phase image of the rightmost rectangle of FIG. 6B.

FIG. 6L illustrates the single height back propagated PSR amplitude image of the rightmost rectangle of FIG. 6B.

FIG. 7A illustrates a back propagated phase image of a Pap smear from one PSR lensfree hologram (1 height).

FIG. 7B illustrates a multi-height (2 heights) based PSR lensfree phase image of the same Pap smear sample.

FIG. 7C illustrates a multi-height (3 heights) based PSR lensfree phase image of the same Pap smear sample.

FIG. 7D illustrates a multi-height (4 heights) based PSR lensfree phase image of the same Pap smear sample.

FIG. 7E illustrates a multi-height (5 heights) based PSR lensfree phase image of the same Pap smear sample.

FIG. 7F illustrates a comparative 10× objective lens (0.25 NA) microscope image of the same field of view.

FIG. 8A illustrates a single height based back propagated PSR amplitude image of a UCLA pattern etched on a glass slide. The letters "U" and "C" have a spacing of about 1 nm.

FIG. 8B illustrates a multi-height (2 heights) based PSR lensfree amplitude image of the same UCLA pattern of FIG. 8A ($\lambda$=490 nm). Sixty (60) iterations were used in the reconstruction.

FIG. 8C illustrates a multi-height (3 heights) based PSR lensfree amplitude image of the same UCLA pattern of FIG. 8A. Thirty (30) iterations were used in the reconstruction.

FIG. 8D illustrates a multi-height (4 heights) based PSR lensfree amplitude image of the same UCLA pattern of FIG. 8A. Twenty (20) iterations were used in the reconstruction.

FIG. 8E illustrates a multi-height (5 heights) based PSR lensfree amplitude image of the same UCLA pattern of FIG. 8A. Fifteen (15) iterations were used in the reconstruction.

FIG. 8F illustrates a microscope comparison image of the same UCLA pattern using a 40× objective lens (0.65 NA).

FIG. 9A illustrates a full FOV (~30 mm$^2$) holographic image of a SUREPREP Pap smear sample acquired using the field-portable microscope of FIGS. 3A and 3B.

FIG. 9B illustrates the multi-height (5 heights) based PSR lensfree amplitude image of Zone 1 from FIG. 9A of the SUREPREP Pap smear sample. Total ten iterations were used.

FIG. 9C illustrates the multi-height (5 heights) based PSR lensfree amplitude image of Zone 2 from FIG. 9A of the SUREPREP Pap smear sample. Total ten iterations were used.

FIG. 9D illustrates the multi-height (5 heights) based PSR lensfree phase image of Zone 1 from FIG. 9A of the SUREPREP Pap smear sample. Total ten iterations were used.

FIG. 9E illustrates the multi-height (5 heights) based PSR lensfree phase image of Zone 2 from FIG. 9A of the SUREPREP Pap smear sample. Total ten iterations were used.

FIG. 9F illustrates a microscope image (40×, 0.65 NA) of Zone 1 from FIG. 9A.

FIG. 9G illustrates a microscope image (40×, 0.65 NA) of Zone 2 from FIG. 9A.

FIG. 10A illustrates a multi-height (5 heights) based PSR lensfree amplitude image of a THINPREP Pap smear sample.

FIG. 10B illustrates a multi-height (5 heights) based PSR lensfree phase image of a THINPREP Pap smear sample.

FIG. 10C illustrate a conventional 40× microscope image (0.65 NA) of the same THINPREP Pap smear sample of FIGS. 10A and 10B.

FIG. 10D illustrates a multi-height (5 heights) based PSR lensfree amplitude image of a THINPREP Pap smear sample.

FIG. 10E illustrates a multi-height (5 heights) based PSR lensfree phase image of a THINPREP Pap smear sample.

FIG. 10F illustrate a conventional 40× microscope image (0.65 NA) of the same THINPREP Pap smear sample of FIGS. 10D and 10E.

FIG. 10G illustrates a multi-height (5 heights) based PSR lensfree amplitude image of a THINPREP Pap smear sample.

FIG. 10H illustrates a multi-height (5 heights) based PSR lensfree phase image of a THINPREP Pap smear sample.

FIG. 10I illustrate a conventional 40× microscope image (0.65 NA) of the same THINPREP Pap smear sample of FIGS. 9G and 9H.

FIG. 11A illustrates the single height back propagated PSR phase image of a SUREPATH Pap smear sample.

FIG. 11B illustrates a multi-height (2 heights) based PSR lensfree phase image of the SUREPATH Pap smear sample.

FIG. 11C illustrates a multi-height (3 heights) based PSR lensfree phase image of the SUREPATH Pap smear sample.

FIG. 11D illustrates a multi-height (4 heights) based PSR lensfree phase image of the SUREPATH Pap smear sample.

FIG. 11E illustrates a multi-height (5 heights) based PSR lensfree phase image of the SUREPATH Pap smear sample.

FIG. 11F illustrates a conventional 10× microscope image (0.25 NA) of the same SUREPATH Pap smear sample.

DETAILED DESCRIPTION OF THE ILLUSTRATED EMBODIMENTS

Figure 1A:
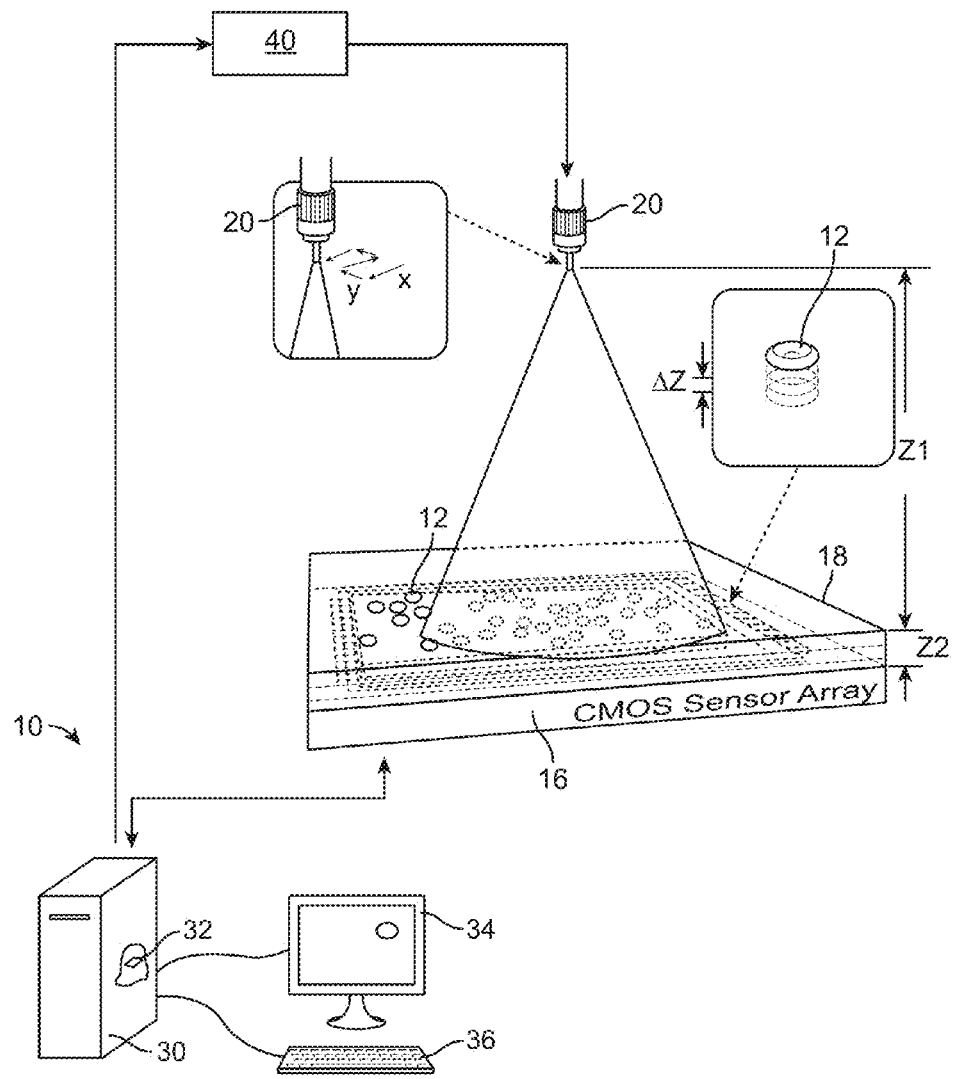
FIG. 1A schematically illustrates a system for imaging densely distributed objects contained in a sample according to one embodiment.
Figure 1B:
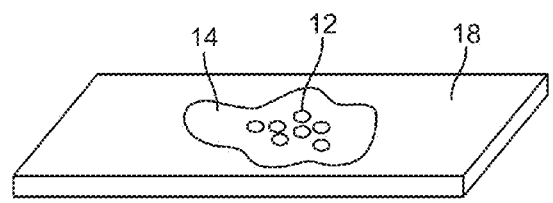
FIG. 1B illustrates a sample containing densely distributed objects disposed on a sample holder.
Figure 2A:
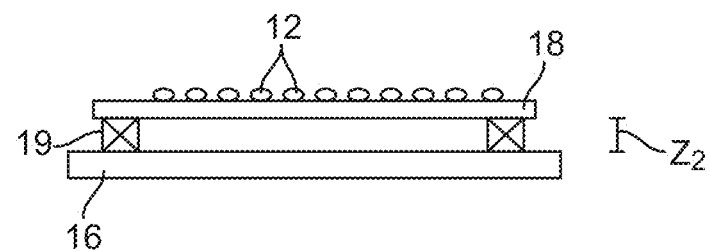
FIG. 2A illustrates a moveable z-adjust stage according to one embodiment.
Figure 2B:
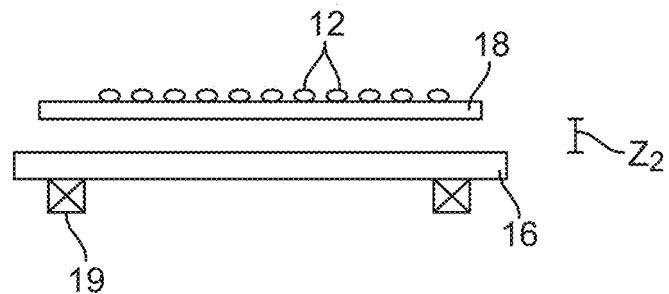
FIG. 2B illustrates a moveable z-adjust stage according to another embodiment.

FIG. 1A illustrates a system 10 for imaging of an object 12 (or more preferably multiple objects 12) within a sample 14 (best seen in FIG. 1B). The object 12 may include a cell or biological component or constituent (e.g., a cellular organelle or substructure). The object 12 may even include a multicellular organism or the like. Alternatively, the object 12 may be a particle or other object. The methods and systems described herein have particularly applicability for samples 14 that contain objects 12 that are densely populated amongst or within the sample 14. FIG. 1A illustrates objects 12 in the form of red blood cells (RBCs) to be imaged that are disposed some distance $z_2$ above an image sensor 16. As explained herein, this distance $z_2$ is adjustable as illustrated by the $\Delta z$ in the inset of FIG. 1A. The sample 14 containing one or more objects 12 is typically placed on a optically transparent sample holder 18 such as a glass or plastic slide, coverslip, or the like as seen in FIG. 1B. The $\Delta z$ may be changed by moving the sample holder 18 relative to the image sensor 16 or, alternatively, by moving the image sensor 16 relative to the sample holder 18. In yet another alternative, $\Delta z$ may be changed by moving both the sample holder 18 and the image sensor 16. For example, as seen in FIG. 2A, the sample holder 18 may be placed on a movable stage 19 that is able to adjust the $z_2$ distance relative to the image sensor 16. Alternatively, as seen in FIG. 2B, the moveable stage 19 may move the image sensor 16 relative to a stationary sample holder 18. For example, the moveable stage 19 may be coupled to a nut or the like (not shown) that moves in the z direction in response to rotation of a shaft or screw (not shown) coupled to the nut. The movable stage 19 preferably moves in generally increments ranging from about 1 µm to about 1.0 cm and more preferably between about 10 µm to about 100 µm. The moveable stage 19 may be actuated manually by a user using a knob, dial, or the like. Alternatively, the moveable stage 19 may be, in some embodiments, automatically controlled using a small actuator such as a motor, linear actuator, or the like. In yet another alternative, different sized (i.e., thicknesses) inserts (e.g., glass slides or the like) can be manually inserted between the sample holder 18 and the image sensor 16 to adjust the sample-to-sensor distance. Likewise, multiple inserts can be inserted between the sample holder 18 and the image sensor 16 to adjust the $z_2$ height. In other alternative embodiments, the actual distance between the image sensor 16 and the sample 14 is not changed. Rather, the effective distance is altered by, for example, changing the wavelength of the illumination source 20 as described below or changing the refractive index of the medium or media located between the image sensor 16 and the sample 14.

Regardless, the surface of image sensor 16 may be in contact with or close proximity to the sample holder 18. Generally, the objects 12 within the sample 14 are located within several millimeters within the active surface of the image sensor 16. The image sensor 16 may include, for example, a charged coupled device (CCD) or a complementary metal-oxide semiconductor (CMOS) device. The image sensor 16 may be monochromatic or color. The image sensor 16 generally has a small pixel size which is less than 9.0 µm in size and more particularly, smaller than 5.0 µm in size (e.g., 2.2 µm or smaller). Generally, image sensors 16 having smaller pixel size will produce higher resolutions. As explained herein, sub-pixel resolution can be obtained by using the method of capturing and processing multiple lower-resolution holograms, that are spatially shifted with respect to each other by sub-pixel pitch distances.

Still referring to FIG. 1A, the system 10 includes an illumination source 20 that is configured to illuminate a first side (top side as seen in FIG. 1A) of the sample holder 18. The illumination source 20 is preferably a spatially coherent or a partially coherent light source but may also include an incoherent light source. Light emitting diodes (LEDs) are one example of an illumination source 20. LEDs are relative inexpensive, durable, and have generally low power requirements. Of course, other light sources may also be used such as a Xenon lamp with a filter. A light bulb is also an option as the illumination source 20. A coherent beam of light such as a laser may also be used (e.g., laser diode). The illumination source 20 preferably has a spectral bandwidth that is between about 0.1 and about 100 nm, although the spectral bandwidth may be even smaller or larger. Further, the illumination source 20 may include at least partially coherent light having a spatial coherence diameter between about 0.1 to 10,000 µm.

The illumination source 20 may be coupled to an optical fiber as seen in FIG. 1A or another optical waveguide. If the illumination source 20 is a lamp or light bulb, it may be used in connection with an aperture (not shown) or multiple apertures in the case of an array which acts as a spatial filter that is interposed between the illumination source 20 and the sample. The term optical waveguide as used herein refers to optical fibers, fiber-optic cables, integrated chip-scale waveguides, an array of apertures and the like. With respect to the optical fiber, the fiber includes an inner core with a higher refractive index than the outer surface so that light is guided therein. The optical fiber itself operates as a spatial filter. In this embodiment, the core of the optical fiber may have a diameter within the range of about 50 µm to about 100 µm. As seen in FIG. 1A, the distal end of the fiber optic cable illumination source 20 is located at a distance $z_1$ from the sample holder 18. The imaging plane of the image sensor 16 is located at a distance $z_2$ from the sample holder 18. In the system 10 described herein, $z_2 \ll z_1$. For example, the distance $z_1$ may be on the order of around 1 cm to around 10 cm. In other embodiments, the range may be smaller, for example, between around 5 cm to around 10 cm. The distance $z_2$ may be on the order of around 0.05 mm to 2 cm, however, in other embodiments this distance $z_2$ may be between around 1 mm to 2 mm. Of course, as described herein, the $z_2$ distance is adjustable in increments ranging from about 1 µm to about 1.0 cm although a larger range such as between 0.1 µm to about 10.0 cm is also contemplated. In other embodiments, the incremental $z_2$ adjustment is within the range of about 10 µm to about 100 µm. The particular amount of the increase or decrease does not need to be known in advance. In the system 10, the propagation distance $z_1$ is such that it allows for spatial coherence to develop at the plane of the object(s) 12, and light scattered by the object(s) 12 interferes with background light to form a lensfree in-line hologram on the image sensor 16.

Still referring to FIG. 1A, the system 10 includes a computer 30 such as a laptop, desktop, tablet, mobile communication device, personal digital assistant (PDA) or the like that is operatively connected to the system 10 such that lower resolution images (e.g., lower resolution or raw image frames) are transferred from the image sensor 16 to the computer 30 for data acquisition and image processing. The computer 30 includes one or more processors 32 that, as described herein in more detail, runs or executes software that takes multiple, sub-pixel (low resolution) images taken at different scan positions (e.g., x and y positions as seen in inset of FIG. 1A) and creates a single, high resolution projection hologram image of the objects 12. The software creates additional high resolution projection hologram images of the objects 12 at each different $z_2$ distance. The multiple, high resolution images obtained at different heights are registered with respect to one another using the software. The software also digitally reconstructs complex projection images of the objects 12 through an iterative phase recovery process that rapidly merges all the captured holographic information to recover lost optical phase of each lensfree hologram without the need for any spatial masking, filtering, or prior assumptions regarding the samples. After a number of iterations (typically between 1 and 75), the phase of each lensfree hologram (captured at different heights) is recovered and one the pixel super-resolved holograms is back propagated to the object plane to create phase and amplitude images of the objects 12. The reconstructed images can be displayed to the user on, for example, a display 34 or the like. The user may, for example, interface with the computer 30 via an input device 36 such as a keyboard or mouse to select different imaging planes.

FIG. 1A illustrates that in order to generate super-resolved images, a plurality of different lower resolution images are taken as the illumination source 20 is moved in small increments generally in the x and y directions. The x and y directions are generally in a plane parallel with the surface of the image sensor 16. Alternatively, the illumination source 20 may be moved along a surface that may be three-dimensional (e.g., a sphere or other 3D surface in the x, y, and z dimensions). Thus, the surface may be planar or three-dimensional. In one aspect of the invention, the illumination source 20 has the ability to move in the x and y directions as indicated by the arrows x and y in the inset of FIG. 1A. Any number of mechanical actuators may be used including, for example, a stepper motor, moveable stage, piezoelectric element, or solenoid. FIG. 1A illustrates a moveable stage 40 that is able to move the illumination source 20 in small displacements in both the x and y directions. Preferably, the moveable stage 40 can move in sub-micron increments thereby permitting images to be taken of the objects 12 at slight x and y displacements. The moveable stage 40 may be controlled in an automated (or even manual) manner by the computer 30 or a separate dedicated controller. In one alternative embodiment, the moveable stage 40 may move in three dimensions (x, y, and z or angled relative to image sensor 16), thereby permitting images to be taken of objects 12 at slight x, y, and z/angled displacements.

In still an alternative embodiment, as illustrated in FIGS. 3A and 3B, rather than move the illumination source 20 in the x and y directions, a system 50 is disclosed that uses a plurality of spaced apart illumination sources can be selectively actuated to achieve the same result without having to physically move the illumination source 20 or image sensor 16. In this manner, the illumination source 20 is able to make relatively small displacement jogs (e.g., less than about 1 µm). The small discrete shifts parallel to the image sensor 16 are used to generate a single, high resolution image (e.g., pixel super-resolution).

As seen in FIGS. 3A and 3B, a system 50 is disclosed that uses a lens-less, on-chip compact microscope 52 that can achieve <1 µm resolution over a wide field-of-view of ~30 mm². This compact lens-less, on-chip microscope 52 weighs ~122 grams with dimensions of 4 cm×4 cm×15 cm and is based on partially-coherent digital in-line holography. The microscope 52 includes a base 54 that includes an image sensor 56 that may take the form of a CMOS or CCD chip (e.g., CMOS sensor-chip Aptina, MT9J003, 1.67 µm pixel size). The base 54 includes a sample tray 58 that is moveable into and out of the base 54. For example, the sample tray 58 is moveable out of the base 54 to load a slide, slip or other sample holder 18 into the same. The sample tray 58 can then be placed closed, whereby the slide, slip, or other sample holder 18 (as seen in FIGS. 1A and 1B) containing the sample 14 is placed atop the image sensor 56. The microscope 52 also includes an interface 60 (FIG. 3A) that can function both for power as well as data transmission. For example, the interface 60 may include a standard USB interface. The USB interface 60 can provide power to both the image sensor 56 as well as the illumination sources discussed below.

The microscope 52 includes an elongate portion 62 extending from the base 54. The elongate portion 62 includes a stand-off 64 that includes a hollow, interior portion through which light passes toward the sample positioned above the image sensor 56. The stand-off 64 may be a tubular member as illustrated in FIGS. 3A and 3B. The stand-off 64 aids in providing the separation distance $z_1$ (FIG. 1A) between the sample 14 and the illumination source 20. A housing 66 forms part of the elongate portion 62 and includes therein a plurality of illumination sources 70. The illumination sources 70 may include light emitting diodes (LEDs), laser diodes, or the like. FIG. 3B illustrates an illumination source 70 that includes an array of LEDs. A processor 72 is operatively coupled directly or indirectly to the illumination sources 70 to selectively actuate individual illumination sources 70. Each illumination source 70 is coupled to an optical fiber 74 or other waveguide that terminates into an illumination array 76 that provides for different illumination locations (i.e., different x and/or y locations). In this regard, rather than have a moving illumination source 20 that is driven via a mechanical stage or other moving component, a series of fibers 74 that are stationary yet placed at different locations relative to the image sensor 56 can be used to effectively provide the sub-pixel shift. The individual fibers 74 may be selected digitally or mechanically. For example, a processor may select individual light sources coupled to selected fibers 74 to provide digital switching functionality. Adjacent optical fibers 74 or waveguides are separated from one another by a distance within the range of about 0.001 mm to about 500 mm.

The multiple fiber-optic waveguides 74 are butt-coupled to light emitting diodes 70, which are controlled by a low-cost micro-controller 72 ((Atmel ATmega8515) to sequentially illuminate the sample. In the microscope 52 of FIG. 3B, twenty four (24) LEDs are used (OSRAM TOPLED, SuperRed, 633 nm). The resulting lensfree holograms are then captured by a digital image sensor 56 and are rapidly processed using a pixel super-resolution algorithm to generate much higher resolution holographic images of the objects 12.

Still referring to FIG. 3B, the base 54 of the microscope 42 includes a z-shift stage 78 that is used to manually adjust the distance $z_2$ between the sample and the image sensor 56. The z-shift stage 78 includes a dial or knob 80 that is manually moved to adjust the distance $z_2$ by a discrete distance. The dial or knob 80 translates lateral or rotational movement of the same into vertical movement of a stage element that is coupled to the image sensor 56. Generally, this distance $z_2$ is adjusted small increments ranging from about 10 µm to about 100 µm. The exact amount of incremental increase or decrease in $z_2$ does not need to be known in advance and may be random. This parameter is digitally determined after image acquisition using an autofocus algorithm. Movement of the dial or knob 80 moves the image sensor 56 relative to a stationary sample holder (e.g., sample holder 18 of FIGS. 1A and 1B) that is held within the sample tray 58. The microscope 52 includes an optional lock 82 that is used to lock the position of the sample 14/sample holder 18.

Figure 4A:
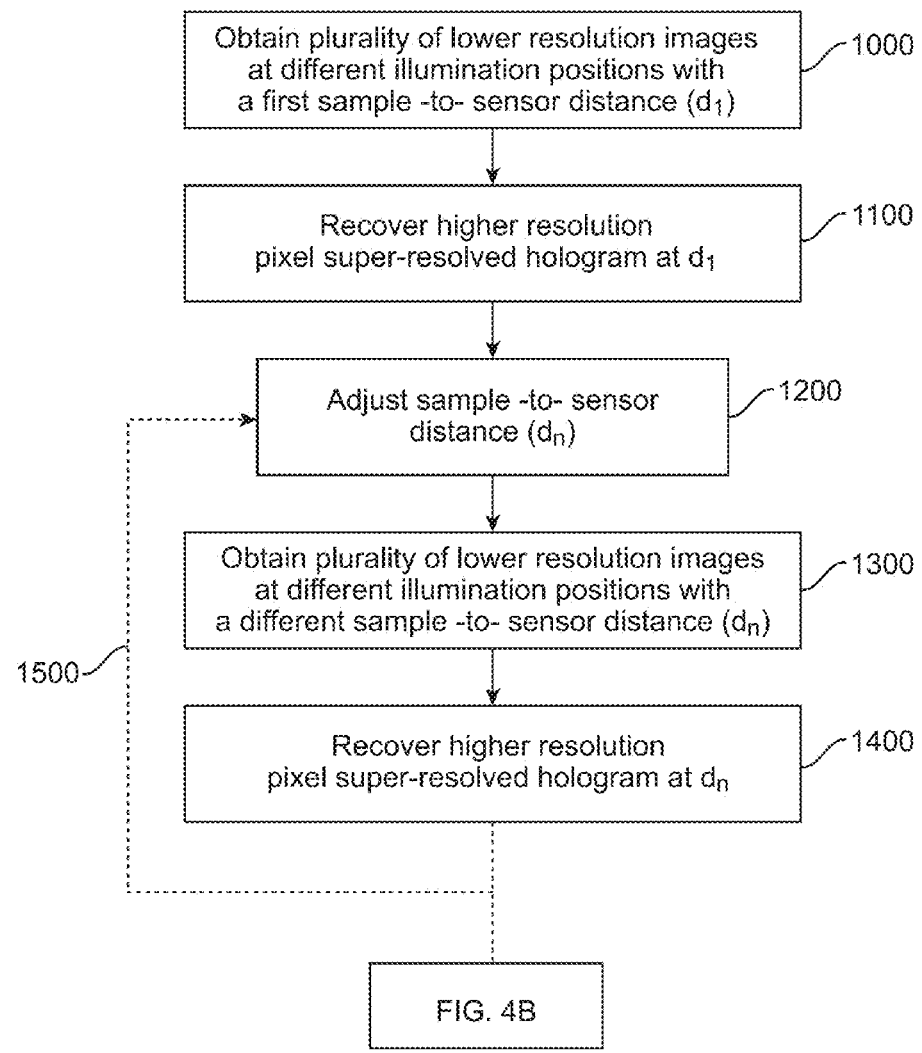
FIGS. 4A and 4B illustrate a method used to reconstruct phase and amplitude images of object(s) contained in a sample according to one embodiment.
Figure 4B:
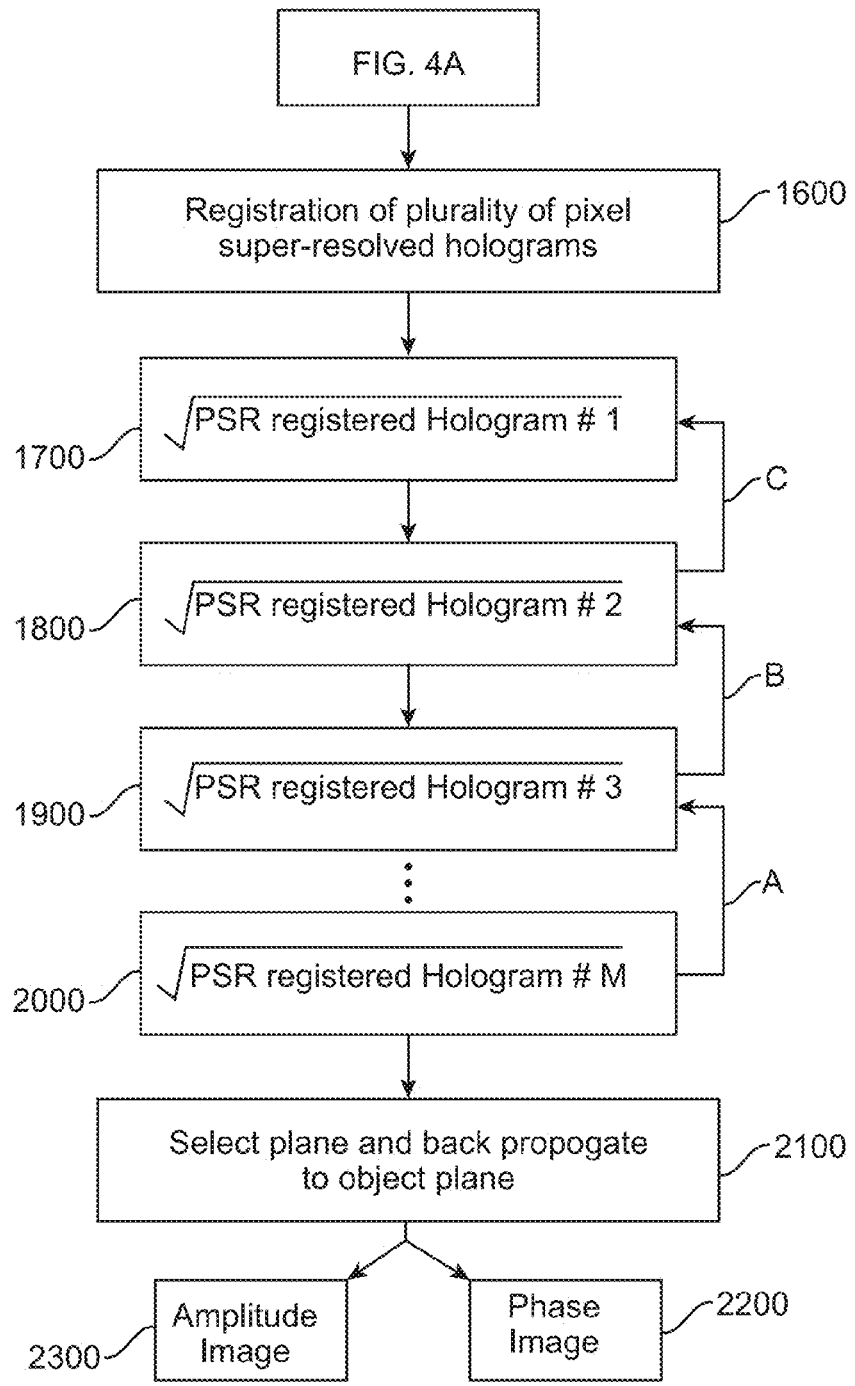

FIGS. 4A and 4B illustrates a method used to reconstruct images of the object(s) 12 from the plurality lower resolution images taken at different positions. Referring to FIG. 4A, in step 1000, a plurality of lower resolution images are obtained of the sample 14 containing the object(s) 12 while the illumination source 20 and/or the image sensor 16 are moved relative to another at a plurality of different locations (e.g., x, y locations) to create the sub-pixel image shifts. The number of lower resolution images may vary but generally includes between about 2 and 250 images. During step 1000, the sample 14 is disposed from the image sensor 16 at a first distance ($d_1$). Next, as seen in step 1100, a pixel super-resolved (PSR) hologram is synthesized based upon the plurality of lower resolution images obtained in operation 1000. The details of digitally converting a plurality of lower resolution images into a single, higher resolution pixel SR image may be found in Bishara et al., Lensfree on-chip microscopy over a wide field-of-view using pixel super-resolution, *Optics Express* 18:11181-11191 (2010), which is incorporated by reference. This pixel super-resolution step takes lower resolution holographic shadows of the object(s) 12 (e.g., captured at ~10 million pixels each in the case of the microscope 52 of FIGS. 3A and 3B) and then creates a higher resolution lensfree hologram that now contains >300 million pixels over the same 30 mm² field-of-view with an effective pixel size of ~300 nm.

Next, as seen in operation 1200, the distance between the sample 14 and the image sensor 16 is adjusted to a different distance ($d_n$). At this new distance ($d_n$), as seen in operation 1300, a plurality of lower resolution images are obtained of the sample 14 containing the object(s) 12 while the illumination source 20 and/or the image sensor 16 are moved relative to another at a plurality of different locations (e.g., x, y locations) to create the sub-pixel image shifts. The plurality of lower resolution images are obtained while the sample 14 and the image sensor 16 are located at the new or different distance ($d_n$). After the lower resolution images are obtained, as seen in operation 1400, a pixel super-resolved hologram (at the different distance ($d_2$)) is synthesized based upon the plurality of lower resolution images obtained in operation 1200. As seen by arrow 1500, process is repeated for different sample-to-sensor differences. Generally, the process repeats such that a pixel super-resolved hologram is created at between 2-20 different distances although this number may vary.

Now referring to FIG. 4B, the plurality of pixel super-resolved holograms obtained at the different heights are then registered with respect to each other as seen in operation 1600. The subsequent iterative phase recovery requires that these pixel super-resolved holograms are accurately registered to each other. During the image acquisition step, lateral translation and rotation of the objects 12 between holograms of different heights are unavoidable. To accurately register these pixel super-resolved holograms to each other, three-control points from three different corners of the image are selected in one of the holograms (which is deemed the reference hologram). One preferred control point could be a small isolated dust particle at a corner since its hologram is circularly symmetric. If need be, a special alignment marker (s) can also be placed at the corners of the sample holder/substrate. Therefore, normalized correlations between lens-free holograms can be used to find the matching points in each image captured at a different height. After selection of the control points, a small area (e.g., ~30×30 μm) around each control point is cropped and digitally interpolated (~4-6 times) to serve as a normalized correlation template. Furthermore, for accurately finding the coordinate shift of each control point among M images, lensfree holographic images have to be positioned in the same $z_2$-distance. Therefore, the difference in the $z_2$-distance between lensfree holograms acquired at different heights is evaluated by an auto-focus algorithm, such as that disclosed in J. L. Pech-Pacheco et al., "Diatom Autofocusing in Brightfield Microscopy: a Comparative Study," in *Pattern Recognition, International Conference On* (IEEE Computer Society, 2000), Vol. 3, p. 3318, incorporated herein by reference, which permits one to digitally propagate the selected correlation templates to the same $z_2$-distance, where normalized correlations are calculated to find the coordinate shifts between the control points in each image. An affine transformation is used to register the super-resolved holograms of different heights to the reference hologram.

Still referring to FIG. 4B, operations 1700, 1800, 1900, and 2000 illustrate the iterative phase recovery process that is used to recover the lost optical phase. Additional details regarding the iterative phase recovery process may be found in L. J. Allen and M. P. Oxley, Optics Communications, 2001, 199, 65-75, which is incorporated herein by reference. The square roots of these resulting M registered holograms are then used as amplitude constraints in the iterative phase recovery algorithm that is steps 1700 through 2000. At the beginning of the algorithm, as seen in operation 1700, the initial phase is assumed to be zero, after which the iterative phase recovery algorithm uses the free space propagation function to digitally propagate back and forth among these multiple heights. At each height, the amplitude constraint (i.e., the measurement) is enforced while the phase is kept from the previous digital propagation step.

To initiate the phase recovery process, a zero-phase is assigned to the object intensity measurement. One iteration during this phase-recovery process can be described as follows: Intensity measurement #1 (step 1700) is forward propagated (with zero initial phase) to the plane of intensity measurement #2 (step 1800). Then, the amplitude constraint in measurement #2 (step 1800) is enforced while the calculated phase resulting from forward propagation remains unchanged. The resulting complex field is then forward propagated to the plane of intensity measurement #3 (step 1900), where once again the amplitude constraint in measurement #3 is enforced while the calculated phase resulting from forward propagation remains unchanged. This process continues until reaching the plane of intensity measurement #M (step 2000). Then instead of forward propagating the fields of the previous stages, back propagation is used as seen by respective arrows A, B, and C. The complex field of plane #M (step 2000) is back propagated to the plane of intensity measurement #M−1. Then, the amplitude constraint in measurement #M−1 is enforced while the resulting phase remains unchanged. The same iteration continues until we reach the plane of intensity measurement #1 (step 1700). When one complete iteration is achieved (by reaching back to the plane of intensity measurement #1), the complex field that is derived in the last step will serve as the input to the next iteration. Typically, between 1-1,000 iterations and more typically between 1-70 iterations are required for satisfactory results. After the phase recovery iterations are complete, as seen in operation 2100, the acquired complex field of any one of the measurement planes is selected and is back propagated to the object plane to retrieve both phase image 2200 and amplitude image 2300 of the object(s) 12 within the sample 14.

Figure 4C:
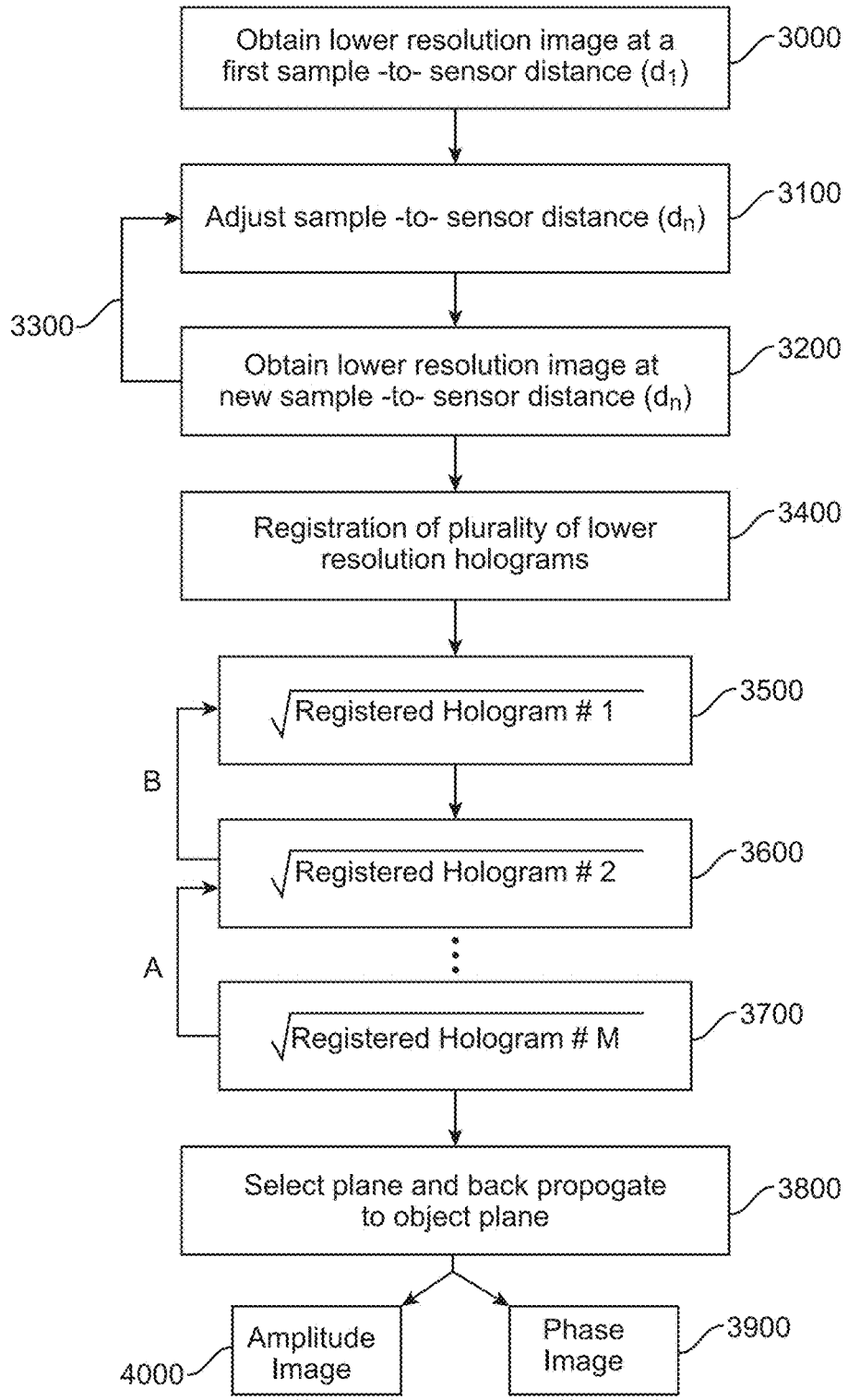
FIG. 4C illustrates a method used to reconstruct phase and amplitude images of object(s) contained in a sample according to another embodiment.

While FIGS. 4A and 4B illustrate a preferred method to reconstruct images of the object(s) 12 from the plurality lower resolution images taken at different positions, in another alternative embodiment, the method can be employed without recovering higher resolution pixel super-resolved holograms or images. In this alternative embodiment, a plurality of lower resolution images are obtained at the same illumination positions (e.g., no x or y shifting) at different sample-to-sensor distances ($d_n$). FIG. 4C illustrates a preferred method according to this embodiment.

As seen in FIG. 4C, in operation 3000 a lower resolution image at a first sample-to-sensor distance ($d_1$) is obtained. The sample-to-sensor distance ($d_n$) is then adjusted as seen by operation 3100 by any of the methods described herein. A lower resolution image at the new sample-to-sensor distance is then obtained as seen in operation 3200. As seen by return arrow 3300, the adjustment of the sample-to-sensor distance and image acquisition takes place for a number of cycles. Generally, the process repeats at between 2-20 different distances although this number may vary. Still referring to FIG. 4C, the plurality of lower resolution images obtained at the different sample-to-sensor distances are then registered with one another as seen in operation 3400. Operations 3500, 3600, and 3700 illustrate the iterative phase recovery process that is used to recover the lost optical phase. Back propagation is conducted as in the prior embodiment and is seen by respective arrows A and B. These operations may be the same as those described above with respect to the method illustrated in FIG. 4B. After the phase recovery iterations are complete, as seen in operation 3800, the acquired complex field of any one of the measurement planes is selected and is back propagated to the object plane to retrieve both phase image 3900 and amplitude image 4000 of the object(s) 12 within the sample 14. The embodiment of FIG. 4C may be simpler, faster, and more cost-effective in some instances.

EXPERIMENTAL

A device similar to the setup disclosed in FIG. 1A was tested with both blood smear samples and Papanicolaou smear (Pap smear) samples. The set-up is composed of a partially coherent light source (~5 nm bandwidth centered at 550 nm), glass cover slips with different thicknesses (to adjust $z_2$) and a CMOS detector-array. Blood smear samples were prepared using whole blood (UCLA Blood Bank, USA), where the samples were diluted (×2) with RPMI (Thermo Scientific, Catalog #: SH3002701) in room temperature. Then 5 µL of the diluted blood was dropped on a type-one glass cover slip (Fisher Scientific Catalog #12-548-A). The blood droplet was then smeared by a second cover slip by applying a constant force. The sample was then left to dry in air for ~10 minutes before being fixed and stained by HEMA 3 Wright-Giemsa staining kit (Fisher Diagnostics). The Papanicolaou smear (Pap smear) was prepared using a standard SUREPETH (BD Inc.) procedure.

The $z_2$ distance was controlled by placing glass cover slips with different thicknesses between the sample and the image sensor (e.g., different inserts). The thicknesses of the glass cover slips varied between 50 µm and 250 µm, hence the corresponding $z_2$ distances varied between ~0.7 mm and ~1 mm. Each lensfree intensity measurement is sampled by the CMOS image sensor with 2.2 µm pixel size. This relatively large pixel size can cause undersampling issues; therefore, the PSR method was applied in order to effectively decrease the detector pixel size. For each $z_2$-distance a lower-resolution (LR) image stack is captured, where each image in this stack is sub-pixel shifted with respect to the other images in the stack. These sub-pixel shifts are achieved by a slight translation of the fiber-tip position between two sequential images.

FIGS. 5A-5F illustrate the benefits of using the above outlined multi-height lensfree imaging approach for a blood smear sample. FIG. 5A shows a full FOV (~24 mm²) low resolution (LR) lensfree hologram as captured by the CMOS sensor. The dashed rectangle focuses on an area that is rather dense; however the blood cells are still organized as a mono-layer, suitable for imaging. The reconstruction results of this dense blood smear using five different $z_2$-distances (711 µm, 767 µm, 821 µm, 876 µm and 946 µm) are shown in FIG. 5B. These five $z_2$-distances/heights are automatically evaluated by using an auto-focus algorithm. The reconstruction results of FIG. 5B provide a good agreement to a 10× microscope objective comparison image shown in FIG. 5C. FIGS. 5D, 5E, and 5F provide images of zoomed areas (taken from the dashed rectangle in FIG. 5B) of single height back propagation image, multi-height (5 heights) reconstruction image, and a 20× microscope objective comparison image, respectively. The back propagated single height image as seen in FIG. 5D has lower contrast, and it is hard to evaluate the locations of the RBCs for spatial masking purposes. Therefore support-based phase recovery would not be effective in this case. On the other hand, the multi-height amplitude image as see in FIG. 5E has significantly improved contrast, and individual RBCs can be identified and resolved even in dense clusters. It is important to emphasize that these multi-height reconstruction images shown in FIGS. 5B and 5E are obtained without the use of any spatial masking or any other prior information regarding the sample.

FIGS. 6A, 6B, 6C, 6D, 6F, 6G, 6H, 6I, 6K, and 6L illustrate imaged Pap smears (based on SUREPATH automated slide preparation) using the same multi-height imaging set-up. FIGS. 6E and 6J illustrate comparative 40× objective lens (0.65 NA) microscope images. Because of the density of the specimen, the reconstruction of this image is a challenging task for any phase recovery method. FIG. 6A shows the multi-height phase image, which is recovered using lensfree measurements from five different heights (754 µm, 769 µm, 857 µm, 906 µm and 996 µm). The $z_2$-distances were automatically determined using an auto-focus algorithm. FIGS. 6C and 6H show zoomed images of the same Pap smear sample for the amplitude channel. FIGS. 6D and 6I show zoomed images of the same Pap smear sample for the phase channel. In these reconstructed multi-height images the cell morphology is clear and their boundaries can clearly be seen and separated from the background. Moreover, minor overlaps among the cells do not constitute a limitation in this method. As a comparison, FIG. 6B depicts a single height back propagated phase image corresponding to one of the $z_2$ measurements (the FOV is the same as in FIG. 6A).

It is evident that distinguishing the cells from the background is a difficult task in this dense reconstructed image. To better provide a comparison, FIGS. 6F and 6K show zoomed images of the same Pap smear sample for the phase channel calculated using back propagation of a single height image. FIGS. 6G and 6L show zoomed images of the same Pap smear sample for the phase amplitude channel calculated using back propagation of a single height image. Compared to FIGS. 6D, 6I and 6C, 6H, the single height back projection images show significant spatial distortion due to the density of the cells. FIGS. 6E and 6J also provide 40× objective lens (0.65 NA) microscope comparison images for the same zoomed regions, clearly providing a good match to the multi-height reconstruction results shown in FIGS. 6D, 6I and 6C, 6H. Note the enhanced contrast of the cell boundaries in the phase images FIGS. 6D and 6I which is complementary to the spatial information coming from the amplitude images (FIGS. 6C and 6H). This complementary set of information that is conveyed by the amplitude and phase images might facilitate detection of abnormal cells within a Pap test that are characterized for instance by a high nuclear-cytoplasmic ratio.

An investigation was conducted how the number of intensity measurements used in the iterative reconstruction process affects the image quality. To provide a fair comparison (i.e., to better isolate the source of improvement in image quality), a total of 144 Fourier transform pairs were used in each case, regardless of the number of intensity measurements employed in the multi-height based phase recovery. FIG. 7A shows a single height back propagated phase image. When a second intensity measurement is added, multi-height based iterative phase recovery approach can be utilized. Consequently, the recovered phase image after 72 iterations (FIG. 7B) looks significantly better than the phase image of FIG. 7A. A further improvement in image quality is achieved by adding a third intensity measurement to the multi-height phase recovery process as seen in FIG. 7C. After 36 iterations (i.e., corresponding to a total of 144 Fourier transform pairs as before), the cells that were hidden in the noisy background are now visible as seen by arrows in FIG. 7C. A moderate improvement is noticed in the image contrast when adding more intensity measurements, as can be seen in the reconstructed multi-height phase images from four and five heights, respectively (FIGS. 7D and 7E). Note that in these two cases, 24 and 16 iterations were used, respectively, so that the total number of Fourier transform operations remains the same in all reconstructions shown in FIGS. 7B-7E, which helps to isolate the source of this image quality improvement and relate it to multiple height measurements rather than the number of back-and-forth digital propagation operations. FIG. 7F shows a microscope comparison image (10×, 0.25 NA) for the same region of interest.

After validating the usefulness of pixel super-resolved multi-height based phase recovery approach with dense blood smears and Pap tests, an isolated 'UCLA' pattern was also imaged that was etched on a glass slide using focused ion beam (FIB) milling, where the letters 'U' and 'C' are ~1 μm apart. The single height back propagated super-resolved holographic image is shown in FIG. 8A, where the letters 'U' and 'C' are clearly separated. The 'UCLA' pattern is spatially isolated from nearby objects, and therefore for this small isolated FOV phase recovery is not necessary. FIGS. 8B, 8C, 8D, and 8E illustrate multi-height based reconstructed amplitude images, for two, three, four and five different heights, respectively ($\lambda$=490 nm). For a fair comparison among these recoveries, once again the number of Fourier transform pairs was kept constant in each case, as a result of which each reconstruction used a different number of iterations (60, 30, 20 and 15 iterations, respectively). It is evident that the letters 'U' and 'C' are clearly separated in all of these images, which is an indication of our success in cross registration of different height super-resolved holograms to each other so that spatial smearing affects due to possible inconsistencies among different $z_2$ lensless holograms are minimized A microscope comparison image of the same "UCLA" pattern can also be seen in FIG. 8F, acquired using a 40× objective lens (0.65 NA).

The performance of the portable microscope 52 of FIGS. 3A and 3B was experimentally validated by imaging Papanicolaou smears (Pap smear). Two FDA-approved liquid-based Pap smear preparation techniques (SUREPATH and THINPREP) were used to test the imaging performance of the portable microscope 52. FIG. 9A illustrates a full FOV (~30 mm$^2$) hologram of a Pap smear sample prepared by SUREPATH technique. In this Pap smear, the cells form a dense and confluent two-dimensional layer on a glass slide. In such a dense sample as shown in FIG. 9A, a simple back-propagation of the hologram to the object plane will result in a distorted image for which the object-support (required for phase recovery based on a single height) would be rather difficult to estimate. However, the multi-height phase recovery approach that is utilized herein requires no prior information or spatial masking/filtering step for proper image reconstruction. FIGS. 9B and 9C show the reconstructed amplitude images of Zones 1 and 2 respectively. FIGS. 9D and 9E show the reconstructed phase images of Zones 1 and 2 respectively. These images were reconstructed using five different heights (933 μm, 1004 μm, 1041 μm, 1065 μm and 1126 μm, each of which was automatically determined using an auto-focus algorithm) and ten iterations were used. FIGS. 9F and 9G illustrate microscope images (40× objective, 0.65 NA) of the same Zone 1 and Zone 2 regions, respectively.

In the reconstructed amplitude images (FIGS. 9B and 9C), the cells' cytoplasm is relatively difficult to see, while the nuclei are quite visible with good contrast. Meanwhile, in the corresponding phase images (FIGS. 9D and 9E) the cells' cytoplasm is much more visible compared to the amplitude images. This complementary set of spatial information coming from phase and amplitude channels of the microscope is rather valuable and might become useful especially for automated estimation of the Nuclear-Cytoplasmic ratio (NC ratio) of each cell on the smear. For instance a large NC ratio is considered as an indicator of an abnormal cell that might be cancerous.

An alternative liquid-based Pap smear preparation method is THINPREP. In this method, the sample is sparser compared to SUREPATH preparation. Nevertheless, cells are still overlapping with each other, forming clusters. The imaging results for a THINPREP Pap smear sample are summarized in FIGS. 10A, 10B, 10D, 10E, 10G, and 10H, where phase and amplitude images of the cells are reconstructed without the use any spatial masks or filtering operations that would have been normally required for a single height lensfree measurement. Corresponding microscope images (10×, 0.25 NA) are shown in FIGS. 10C, 10F, and 10I. The holographic images shown in FIGS. 10A, 10B, 10D, 10E, 10G, and 10H were reconstructed using five different heights (936 μm, 993 μm, 1036 μm, 1064 μm and 1080 μm, each of which was automatically determined using an auto-focus algorithm) and ten iterations were used as part of the phase recovery process. The cells and their inner morphology were successfully reconstructed in FIGS. 10A, 10B, 10D, 10E, 10G, and 10H and are in good agreement with the microscope comparison images provided in FIGS. 10C, 10F, and 10I. Once again, the phase images provide more information/contrast regarding the cell boundaries while the amplitude images provide more information regarding the cells' inner structures, including nuclei.

An investigation was also conducted into how the number of hologram heights (i.e., M) affects the image quality of the microscope 52. FIGS. 11A-11E provide reconstructed phase images of Pap smear samples prepared using the SUREPATH technique at one, two, three, four, and five heights, respectively. The heights were located 933 μm, 1004 μm, 1041 μm, 1065 μm and 1126 μm from the detector plane. To provide a fair comparison among the reconstructions, the same number of Fourier transform pairs was used (i.e., 96 pairs) in each case. It is apparent that the back-propagated image (FIG. 11A) corresponding to a single height hologram does not provide useful information. A significant image quality improvement is demonstrated in FIG. 11B when two heights are used for phase recovery. A further improvement in image quality is also noticeable when using three heights instead of two (from FIG. 11B to 11C). When adding the fourth and fifth heights, the improvement in image quality becomes incrementally better.

While the invention described herein has largely been described as a "lens free" imaging platform, it should be understood that various optical components, including lenses, may be combined or utilized in the systems and methods described herein. For instance, the devices described herein may use small lens arrays (e.g., micro-lens arrays) for non-imaging purposes. As one example, a lens array could be used to increase the efficiency of light collection for the sensor array. Such optical components, while not necessary to image the sample and provide useful data and results regarding the same may still be employed and fall within the scope of the invention. While embodiments of the present invention have been shown and described, various modifications may be made without departing from the scope of the present invention. The invention, therefore, should not be limited, except to the following claims, and their equivalents.

What is claimed is:

1. A method of imaging a sample comprising:
illuminating a sample spaced apart from an image sensor at a first distance with an illumination source;
obtaining a hologram image of the sample from an image sensor with the sample spaced apart from the image sensor at the first distance;
illuminating the sample spaced apart from an image sensor at a one or more distances different from the first distance with an illumination source;
obtaining a hologram image of the sample from an image sensor with the sample spaced apart from the image sensor at the one or more distances different from the first distance;
registering the hologram images of the sample obtained at the one or more distances and the hologram image of the sample obtained at the first distance;
recovering lost phase information from the registered images; and
reconstructing an amplitude or phase image of the sample based at least in part on the recovered lost phase information, wherein the hologram images of the sample are obtained without any lenses positioned between the illumination source and the image sensor.

2. The method of claim 1, wherein at least one of the illumination source and the image sensor are configured to move relative to each other.

3. The method of claim 1, wherein the wherein recovering lost phase information from the registered images comprises an iterative recovery of between 1 and 1,000 iterations.

4. A method of imaging a sample comprising:
illuminating a sample spaced apart from an image sensor at a first distance with an illumination source at a plurality of different locations;
obtaining lower resolution image frames of the sample from an image sensor at plurality of different locations with the sample spaced apart from the image sensor at the first distance;
recovering a higher resolution image of the sample at the first distance based at least in part on the plurality of lower resolution image frames obtained at the first distance;
illuminating the sample spaced apart from an image sensor at a one or more distances different from the first distance with an illumination source at a plurality of different locations;
obtaining lower resolution image frames of the sample from an image sensor at plurality of different locations with the sample spaced apart from the image sensor at the one or more distances different from the first distance;
recovering a higher resolution image of the sample at the one or more distances based at least in part on the plurality of lower resolution image frames obtained at the one or more distances;
registering the higher resolution images of the sample obtained at the one or more distances and the higher resolution image of the sample obtained at the first distance;
iteratively recovering lost phase information from the registered higher resolution images; and
reconstructing an amplitude or phase image of the sample based at least in part on the recovered lost phase information.

5. The method of claim 4, wherein the plurality of different locations comprise locations disposed along a surface above the image sensor.

6. The method of claim 4, wherein at least one of the illumination source and image sensor are configured to move relative to each other.

7. The method of claim 4, wherein the illumination source comprises an array of optical waveguides and wherein the plurality of locations are selected manually or digitally.

8. The method of claim 4, wherein iteratively recovering lost phase information from the registered higher resolution images comprises between 1 and 1,000 iterations.

9. The method of claim 4, wherein registering the higher resolutions images of the sample obtained at the one or more distances and the higher resolution image of the sample obtained at the first distance comprises registering at least three points amongst the plurality of higher resolution images.

10. The method of claim 4, wherein the plurality of different locations comprises between 2 and 250 locations.

* * * * *